United States Patent [19]

Hoffmann

[11] Patent Number: 4,556,360
[45] Date of Patent: Dec. 3, 1985

[54] ROBOTIC APPARATUS

[76] Inventor: George T. Hoffmann, 680 Van Voorhis Ave., Rochester, N.Y. 14617

[21] Appl. No.: 741,015

[22] Filed: Jun. 3, 1985

Related U.S. Application Data

[63] Continuation of Ser. No. 413,934, Sep. 1, 1982, abandoned.

[51] Int. Cl.⁴ .............................................. B66F 9/00
[52] U.S. Cl. .................................. 414/701; 198/468.2
[58] Field of Search ............... 414/680, 697, 701, 707, 414/710, 732, 738, 748, 718, 744 A; 198/486, 489, 490

[56] References Cited

U.S. PATENT DOCUMENTS

| | | | |
|---|---|---|---|
| 1,286,299 | 12/1918 | Hambleton | 142/17 |
| 1,869,354 | 8/1932 | Bletso et al. | 198/489 |
| 2,331,719 | 10/1943 | Oeschger | 83/102 |
| 2,907,478 | 10/1959 | Zelewsky | 198/344 |
| 3,323,632 | 6/1967 | Modder et al. | 198/489 |
| 3,823,628 | 7/1974 | Fortune | 82/2.7 |
| 3,889,559 | 6/1975 | Scholtes | 82/2.5 |
| 4,029,215 | 6/1977 | Birdwell | 198/489 |
| 4,183,269 | 1/1980 | Molliex | 82/2.5 |

OTHER PUBLICATIONS

"Mazak Slant Turn 25 Chucker & Universal", Yamazaki Machinery Works, Ltd.

Primary Examiner—Robert J. Spar
Assistant Examiner—Donald W. Underwood
Attorney, Agent, or Firm—M. LuKacher

[57] ABSTRACT

A robot arm, especially useful as a parts catcher, uses an extensible arm which may be in the form of a telescopic slide. The arm and a fluid operated actuator, such as a pneumatic cylinder, are pivotally mounted on a base at one end thereof. A wrist is pivotally mounted on the upper end of the arm. The actuator is connected to the wrist and pivots the arm, extends and retracts the arm and pivots the wrist. A receptacle is carried by the wrist and serves to catch parts when the arm is pivoted and extended to a parts catching position. Stops on the arm limit its pivotal and extensile movement. Stops are also provided to limit the pivotal movement of the wrist. These stops and a compression spring which biases the wrist provide static limits or forces against which the actuator works. Because of the location of the stops and the spring, the cycle of movement of the arm between parts catching position and an unloading or delivering position where the receptacle may be tilted and the parts therein dumped is controlled.

18 Claims, 4 Drawing Figures

ROBOTIC APPARATUS

This is a continuation, of application Ser. No. 413,934, filed Sept. 1, 1982, now abandoned.

DESCRIPTION

The present invention relates to robotic apparatus and particularly to a robot arm which may be actuated to pivot and extend so as to perform useful work.

The invention is especially suitable for use in a parts catcher which receives parts upon completion of machining operations and transports the parts to an unloading station. In addition to use as a parts catcher, a robotic arm provided in accordance with the invention may be used in other applications where a cycle of arm actions in rotation about a plurality of pivotal axes, extensions, and retractions are required.

Automation of production operations is extremely desirable, especially in the operation of machine tools. An automatic parts catcher permits machining operations to continue uninterrupted by catching the parts as they are completed rather than requiring the machine to be stopped, particularly for safety reasons, so that the operator may manually remove a completed part. The parts catcher should not interfere with the operation of the machine. The installation of a parts catcher should not require modification of the machine. It is desirable to provide a parts catcher which can be installed in machines in the field without modification thereof so that these machines can be kept in production with minimum down time. The room for installation of a parts catcher is minimal in many types of machines. One machine in which parts catchers are especially desirable is the slant bed lathe. There, most of the available space is occupied by chucks and tool carriers. There is limited room for articulation. Nevertheless, the receptacle for catching the part must find a way to reach a position in close proximity with the chuck to minimize the dropping distance of the part so as to prevent any damage thereto. The catcher must move out of the way during machining operations so as not to interfere therewith. To accomplish these goals without a complex and expensive mechanism is an objective obtained by the robotic apparatus provided by this invention. In addition to parts catching applications, the invention may also be useful wherever a predetermined cycle of arm-like movements requires automation.

Accordingly, it is the principal object of the invention to provide improved robotic apparatus which affords an automatic robot arm which may be used to articulate a parts catcher automatically, as well as in other operations where a cycle of arm actions in rotation and extension requires implementation.

It is a further object of the present invention to provide improved robot arm apparatus wherein a plurality of arm actions may be performed within a small space, such as may include an angular displacement of less than 45 degrees if necessary.

It is a still further object of the present invention to provide an improved robot arm wherein a plurality of actions may be carried out within a limited area.

It is a still further object of the present invention to provide an improved automatic parts catcher which operates close up to the position where a part is to be received for gentle pick up of the part.

It is a still further object of the present invention to provide an improved parts catcher especially suitable for slant bed lathes.

It is a still further object of the present invention to provide an improved robotic arm which is simple in construction and may be actuated with a single fluid actuator, such as a pneumatic cylinder, to provide a plurality of actions.

It is a still further object of the present invention to provide an improved parts catcher which is adaptable for use in existing machine tools without substantial, if any, modification to facilitate the installation thereof.

Briefly described, robotic apparatus embodying the invention makes use of an extensible arm pivotal on the first pivot. A wrist may be rotatably mounted on the arm, as on the outer end thereof opposite to the end at which the arm is pivoted. An extensible actuator is pivotal on a second pivot which may be located on the same base as the arm pivot. The actuator is pivotally connected to the wrist. A plurality of means is provided for limiting the rotation of the arm, the wrist and the extent of extension and contraction thereof to provide static limits or forces against which the cylinder works so as to enable the arm and wrist to execute a predetermined cycle of rotation, extension and wrist rotation as the actuator is extended and retracted.

The foregoing and other objects, features and advantages of the invention, as well as a presently preferred embodiment thereof, will become more apparent from a reading of the following description in connection with the accompanying drawings in which.

Figure 1:
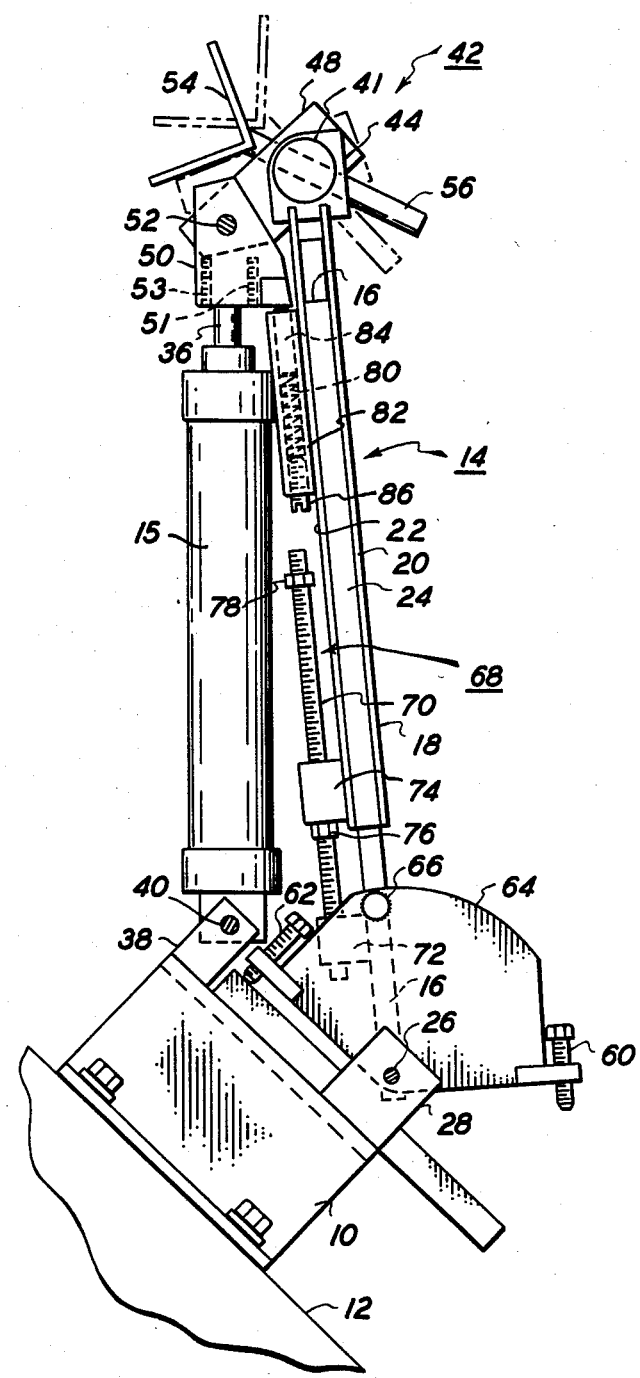
FIG. 1 is a view in elevation of a parts catcher in the unloading and rest position thereof where it can perform the action of delivering or dumping a part.
Figure 2:
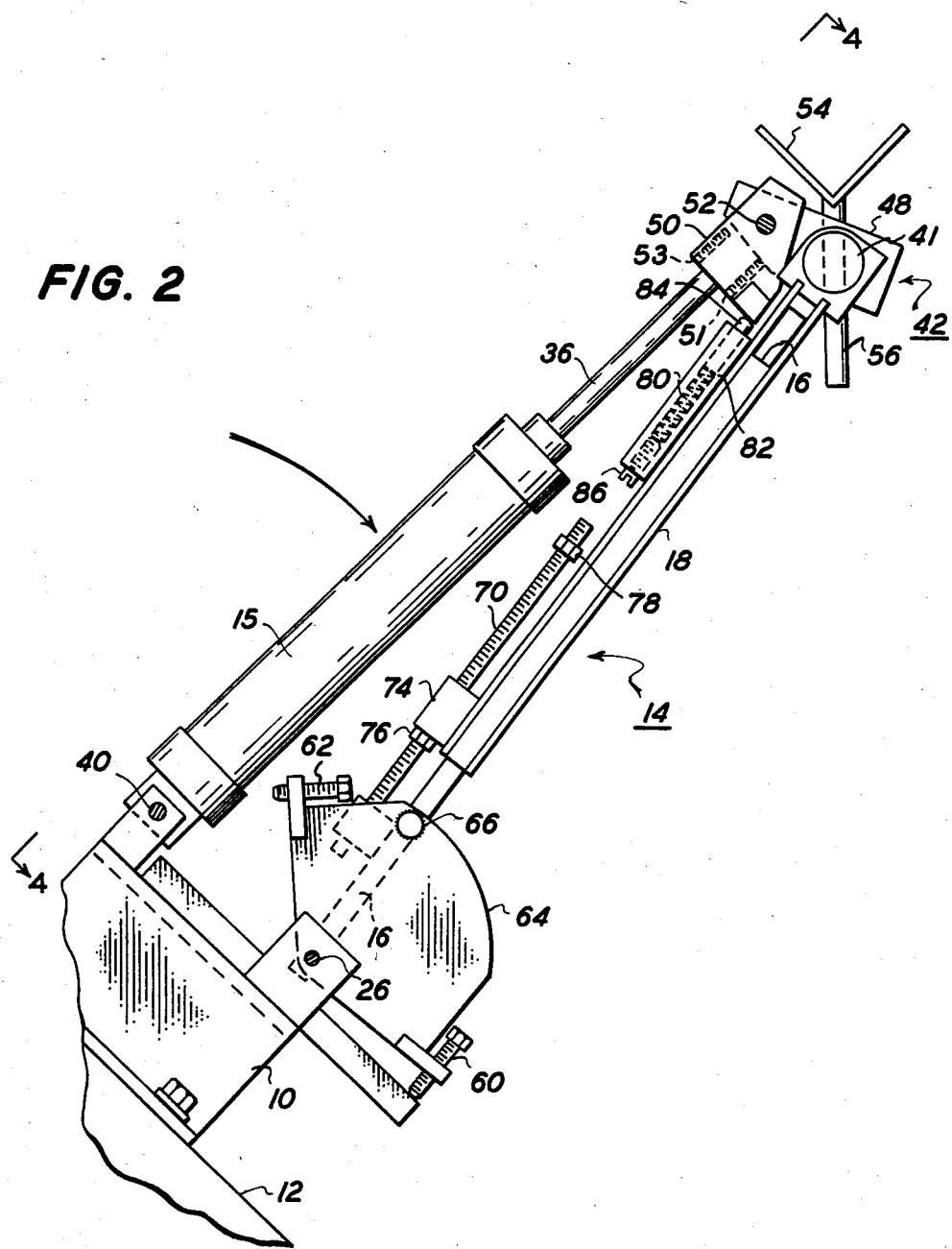
FIG. 2 is a view of the parts catcher shown in FIG. 1 in another position during the cycle of operation thereof after executing rotating actions but prior to extension.
Figure 3:
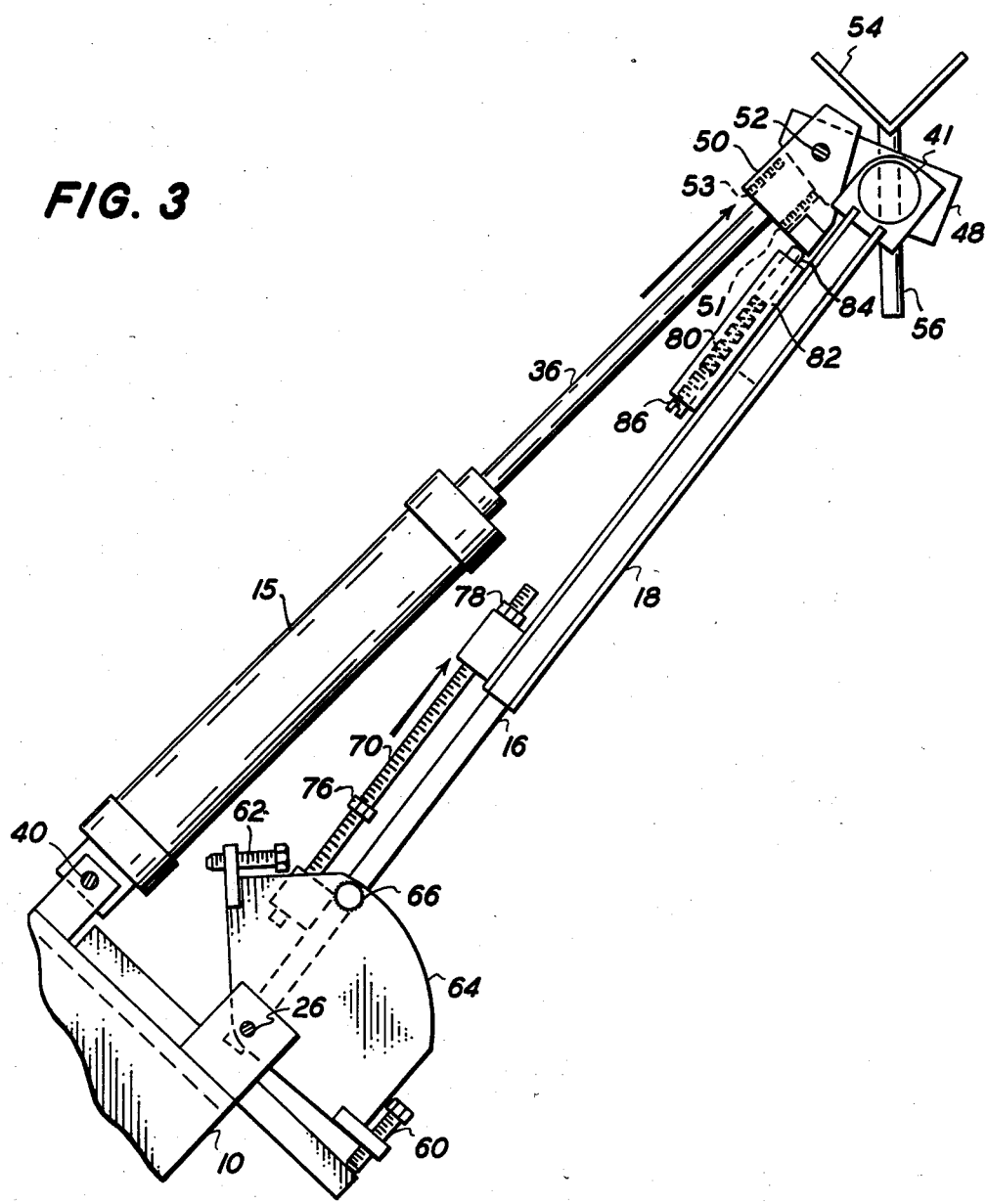
FIG. 3 is a view of the parts catcher shown in FIGS. 1 and 2, extended to a position where it may receive a part.
Figure 4:
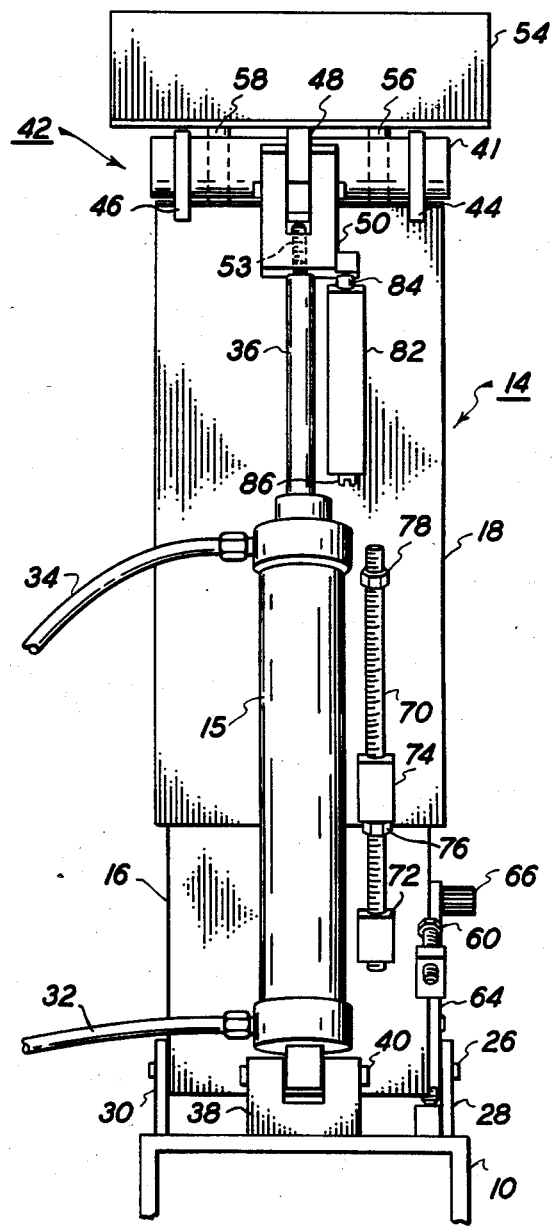
FIG. 4 is a side view of the parts catcher, the view being taken along the lines 4—4 in FIG. 2.

Referring more particularly to the drawings, there is shown a base 10 which may be bolted to the frame 12 of a machine tool, such as a slant bed lathe. An extensible arm 14 and extensible actuator 15 are both pivotally mounted at the lower ends thereof on the base 10. The arm 14 is a telescopic slide having a lower section 16 and an upper section 18. The lower section 16 is a plate. The upper section is a pair of plates 20 and 22 which sandwich the plate 16 of the lower section as a core. Side pieces, one of which 24 is shown in FIGS. 1, 2 and 3 capture the core plate 16 and maintain the upper and lower sections in telescoping relationship. A pin 26 journaled in ears 28 and 30 on the base 10 provide the pivotal mounting for the arm 14.

The cylinder 15 is preferably a double-acting pneumatic cylinder with hoses 32 and 34 providing inlet and outlets for compressed air on opposite sides of a piston. A piston rod 36 is extended and retracted depending on which of the hoses 32 and 34 is connected to the pressurized air supply and is vented to the atmosphere. Hydraulic cylinders or other actuators may also be used. The lower end of the actuator cylinder 15 is pivotally mounted on the base 10 in a bifurcated bracket 38 which journals a pin 40. Only a single actuator is used to operate the mechanism and obtain the plurality of rotational and translational actions thereof. The cycle is controlled by valving connected to the hoses 32 and 34. Conventional pneumatic valves may be used which may be mechanically operated as by cams or electrically operated, as under computer control in N/C machine tools, in timed relationship to the lathe or other machine tool in which the parts catcher is installed.

The pivot provided by the ears 28 and 30 and the pin 26 affords the elbow of the arm 14. A shaft 41 and its associated mechanism provide a wrist 42 of the arm. The wrist 42 is located at the upper end of the arm. The shaft 41 is journaled and retained in members 44 and 46 which provide bearings for the shaft 41. The shaft 41 is connected to a lever 48 which is locked or clamped thereto. The actuator 15 is connected to the wrist by a pivotal connection to the lever 48. A bracket 50, which is bifurcated, contains the lever 48. A pin 52, which is connected to the lever 48 and is journaled in the bracket 50, provides the pivotal connection between the actuator and the wrist.

A receptacle 54, in the form of a V-shaped trough, receives the parts when it is disposed vertically in parts-receiving position as shown in FIG. 3. Stems 56 and 58, on which the trough is mounted, extend diametrically through the shaft and are fixedly held therein. The axial location of the stems 56 and 58 may be adjusted to compensate for different diameters of parts. The receptacle therefore rotates with the shaft 41.

The rotation of the arm 14 is limited by clockwise and counterclockwise stops 60 and 62. These stops are provided by bolts located in a pivot plate 64. The plate 64 pivots upon about the same pivot as the arm 14. This is the pivot provided by the pin 26. The pivot plate 64 is releasably connected to the lower section 16 of the arm 14 by means of a threaded locking pin 66, which may be released only for maintenance purposes.

The rotation of the wrist 42 is limited by clockwise and counterclockwise stops 51 and 53. These stops are provided by set screws located in the bracket 50. The lever 48 rotates within the bracket 50 about a pivot pin 52. Clockwise rotation of the lever 48, and the wrist shaft 41 is limited by the stop 51, while counterclockwise rotation is limited by the other stop 53.

The extension and retraction displacement of the arm 14 is limited by a mechanism 68. This mechanism includes a threaded shaft 70 which is received in a holding block 72 on the lower section 16. Another block 74 on the upper section 18 has a hole therein with sufficient clearance to pass the threaded rod or shaft 70. Nuts 76 and 78 on the threaded rod 70 are engaged by opposite ends of the block 74 with the clearance hole. The nut 78 limits the displacement of the arm when extended. The nut 76 limits the retraction displacement of the arm 14.

A compression spring 80 is captured in a housing 82 between a plunger 84 and a set screw 86. The set screw 86 sets the pressure and the force exerted by the spring 80. The housing 82 is fixedly attached to the plate 22 of the upper section 18 of the arm 14. The plunger 84 bears against the bracket 50. Thus, the spring exerts a force upon the upper arm section 18 which is applied to the wrist lever 48 via the bracket 50, thereby causing the wrist 42 to remain in a clockwise biased position. This spring controls the portion of the cycle during which the receptacle 54 tilts from the position thereof shown on the dotted lines to the position thereof shown in full lines in FIG. 1.

Consider the operation of the parts catcher apparatus shown in the drawings. When, in the rest position, as shown in FIG. 1, the piston rod 36 is withdrawn or retracted into the cylinder of the actuator 15, the arm is pivoted counterclockwise to a position limited by the counterclockwise stop 62. The arm is also retracted to a position limited by the stop nut 76. The wrist 42 is pivoted counterclockwise limited by the stop 53 and is in the delivering position with the receptacle 54 tilted so as to enable the parts caught therein to be dumped, for example, into a chute located at the front of the machine. Compressed air remains applied, in the rest position, through the hoses 34 and maintains the apparatus in that position until the beginning of the next cycle.

The next cycle commences by applying compressed air to the hose 32 and venting the hose 34 to the atmosphere. As soon as the holding force in the retract direction is released, the spring 80 forces the bracket 50 and thence the wrist 42 to pivot to the position shown in dashed lines in FIG. 1. The stop 51 limits the clockwise rotation of the shaft 41.

The continued application of compressed air through the hose 32 continues the application of force from the actuator via the rod 36, the pivot 52 and the wrist 42 to the arm 14. The arm 14 rotates clockwise until its travel is limited by the clockwise stop 60. Until the static limit presented by the clockwise stop is reached, only the rod 36 linearly extends; the arm sections 16 and 18 remaining unextended. As shown in FIG. 2, the receptacle 54 is in vertical position, but still below the position for receiving the parts. Continued application of force from the actuator 15 causes the extension of the piston rod and the extension of the arm to the position limited by upper stop 78, as shown in FIG. 3. The receptacle remains vertical, but now is in the parts receiving position.

Retraction and movement back to parts delivering position shown in FIG. 1 is carried out by reversing the flow of compressed air through the actuator 15. Compressed air is applied to the hose 34, while the hose 32 is vented. The actuator and the arm retract to lower stop 76. The arm and actuator then pivot counterclockwise until the counterclockwise stop 62 reaches the base. The receptacle 54 then is in the position shown in dashed lines in FIG. 1. The spring 80 prevents the tilting of the receptacle through the entire cycle until it reaches this position. Further movement of the arm is restricted by the stops 62 and 76. The force of the actuator now overcomes the bias of the spring 80, and the receptacle tilts to the counterclockwise position shown in full lines in FIG. 1. The parts may drop out of the receptacle into the chute.

The rotation of the wrist 42 enables the rotation of the arm 14 to be limited to less than about forty-five degrees. The arm need not rotate to the extent where the parts in the receptacle can drop out. The wrist further provides assurance that the parts will not be dumped until the unloading position is reached.

It will be seen that a single cylinder, which works against stationary limits or forces due to the stops 60, 62, 51, 53, 76 and 78 and the compression spring 80, enables the arm to execute a predetermined cycle of rotations and extension about its elbow pivot 26 and the wrist shaft 41. Accordingly, complex robotic action is obtained with a simple and effective mechanism.

Variations and modifications in the herein described apparatus, within the scope of invention, will undoubtedly become apparent to those skilled in the art. Accordingly the foregoing description should be taken as illustrative and not in a limiting sense.

I claim:

1. Robotic apparatus which comprises an extensible passive arm pivotable on a first pivot, a wrist rotatably mounted on said arm, an extensible actuator pivotable on a second pivot, said actuator being pivotally connected to said wrist, means against which said actuator works for limiting the distance over which said arm rotates about said first pivot without extending or retracting, and means against which said actuator works for limiting the extension and retraction distances of said arm and enabling the rotation of said wrist whereby said arm and wrist execute a predetermined cycle of arm rotation, arm extension and wrist rotation as said actuator extends and retracts.

2. The apparatus according to claim 1 further comprising a base, means on said base defininging said first and second pivots with their axes in parallel spaced relationship, said arm and said actuator having opposite ends, said first and second pivots being disposed at one of said opposite ends of said actuator and arm respectively, said wrist being mounted at the other of said opposite ends of said arm, and the other of said opposite ends of said actuator being pivotally connected to said wrist.

3. The apparatus according to claim 1 further comprising means for limiting the rotation of said wrist to assist in controlling said cycle.

4. The apparatus according to claim 3 further comprising means on said arm for biasing said wrist against rotation in one sense and against said wrist rotation limiting means in the opposite sense whereby to control the rotation of said wrist during said cycle.

5. The apparatus according to claim 4 further comprising means carried by said wrist and rotatable therewith actuated to provide different operations in different parts of said cycle.

6. The apparatus according to claim 1 wherein said arm has first and second sections in telescoping relationship, one of said sections being mounted on said first pivot and the other of said sections being connected to said wrist.

7. The apparatus according to claim 6 wherein said rotation limiting means comprises means rotatable with said one section having stops angularly displaced on opposite sides of said one section to limit the clockwise and counterclockwise rotation of said arm, and said extension and retraction limiting means comprising first stop means carried by said one section at different distances from said first pivot, and means connected to said other section and engageable with said stop means for limiting the displacement of said other section in the extension and retraction directions.

8. The apparatus according to claim 2 wherein said actuator comprises a fluid actuated piston having a rod extended therefrom, said wrist comprising a shaft shaft, means pivotally linking said rod to said lever to provide said connection between said actuator and said wrist.

9. The apparatus according to claim 8 wherein said arm has first and second sections linearly movable with respect to each other to extend and retract said arm, one of said sections being connected to said first pivot and the other to said wrist, stops limiting the clockwise and counterclockwise rotation of said shaft, a compression spring mounted on said other section and coupled to said rod and said lever for biasing said wrist against one of said shaft stops and in opposition to the force of said actuator exerted in one of said extension and retraction directions.

10. The apparatus according to claim 1 wherein said fluid is compressed air and said actuator is a pneumatic actuator having a cylinder in which the piston and rod are movable.

11. Parts catcher apparatus which comprises a receptacle movable between parts catching and delivering positions, a base, a passive arm having a first section pivotally mounted on said base at one end thereof which defines an end of said arm, and a second section linearly movable with respect to said first section and connected thereto, an actuator having a cylinder with a piston rod movable axially therein, said cylinder being pivotally mounted on said base, means rotationally mounting said receptacle at an end of said second section which defines the end of said arm opposite to said one end thereof, means pivotally connecting said piston rod to said receptacle rotationally mounting means, means against which said actuator works for limiting the distances said arm and receptacle rotate without movement of said first and second sections in the clockwise and counter-clockwise directions as said piston rod extends from and retracts into said cylinder, and means against which said actuator works for limiting the distance said second section moves with respect to said first section after said arm reaches the limits of its rotation established by said rotation limiting means whereby to enable rotation of said receptacle and to bring said receptacle to said catching and delivering positions upon rotation over the limiting distances in different ones of said clockwise and counter-clockwise directions.

12. Parts catcher apparatus according to claim 11 further comprising means for biasing said receptacle mounting means against rotation in a direction which turns said receptacle from upright to tilted position so that the parts therein can be dumped therefrom.

13. Parts catcher apparatus according to claim 12 wherein said biasing means comprises a spring mounted on said second section and connected to said means pivotally connecting said rod to said receptacle mounting means whereby said actuator must overcome the bias of said spring to rotate said receptacle to said tilted position.

14. Parts catcher apparatus as set forth in claim 13 wherein said receptacle defines a trough having a stem, said stem extending diametrically through said shaft, said receptacle mounting means comprising a shaft, said piston rod pivotally connecting means comprising a lever fixed to said shaft and extending radially therefrom, and means pivotally connecting said lever to said piston rod, said spring being a compression spring connected at the opposite ends thereof to said second section and to said lever.

15. Parts catcher apparatus according to claim 11 wherein said first arm section is a member on which said second arm section is slidably mounted, said means for limiting the distance which second section moves comprising a member connected to said first section and extending along said second section, a block on said second section having a hole through which said member passes, and stops on said member engageable with said block at opposite ends thereof for limiting said extension and retraction distances of said second member and arm.

16. Parts catcher apparatus according to claim 15 wherein said second arm section is disposed in telescoping, sliding relationship with said first arm section.

17. Parts catcher apparatus according to claim 16 wherein said first arm section comprises a first plate, and said second section comprises second and third plates disposed on opposite sides of said first plate.

18. Parts catcher apparatus according to claim 17 wherein said rotation limiting means comprises a fourth plate mounted for rotation about the same pivot as said first plate, said fourth plate having stops along edges thereof facing said base, said stops being engageable with said base, and means connecting said fourth plate to said first plate for rotation therewith.

* * * * *